June 8, 1965  A. CORTESI  3,187,467

MACHINE FOR BEVELLING THE EDGES OF GLASS PLATES OR THE LIKE

Filed April 9, 1963  4 Sheets-Sheet 1

Inventor
ANTONIO CORTESI
By Imirie & Smiley
Attorneys

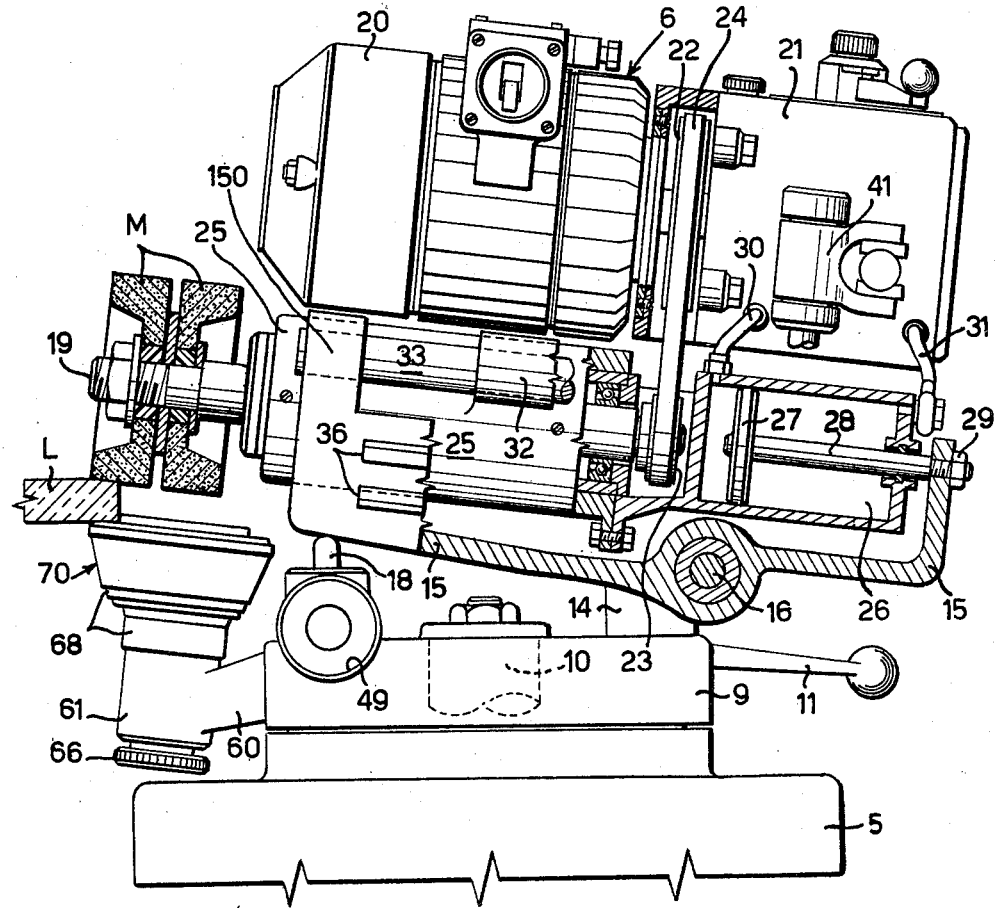
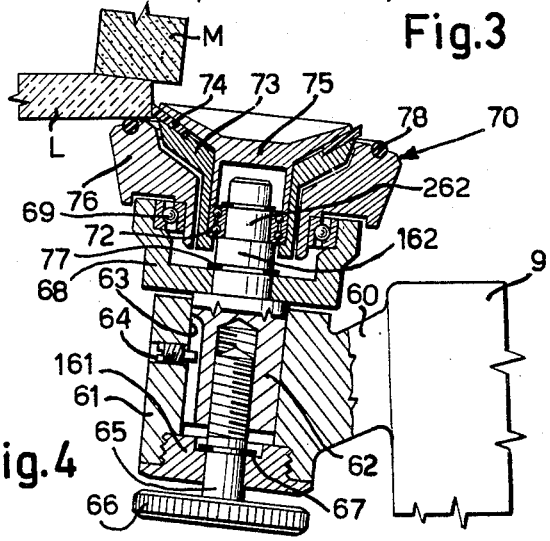

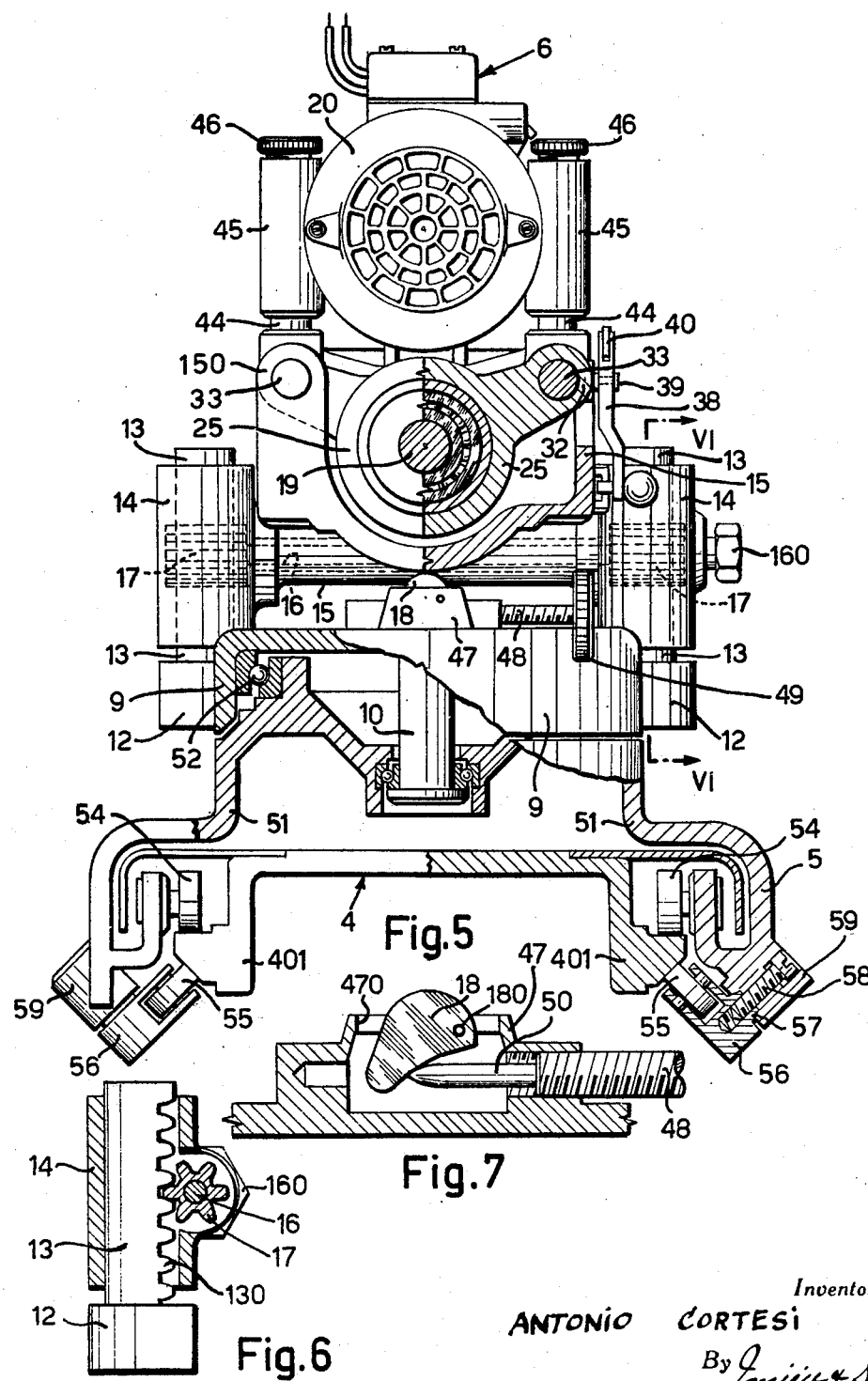

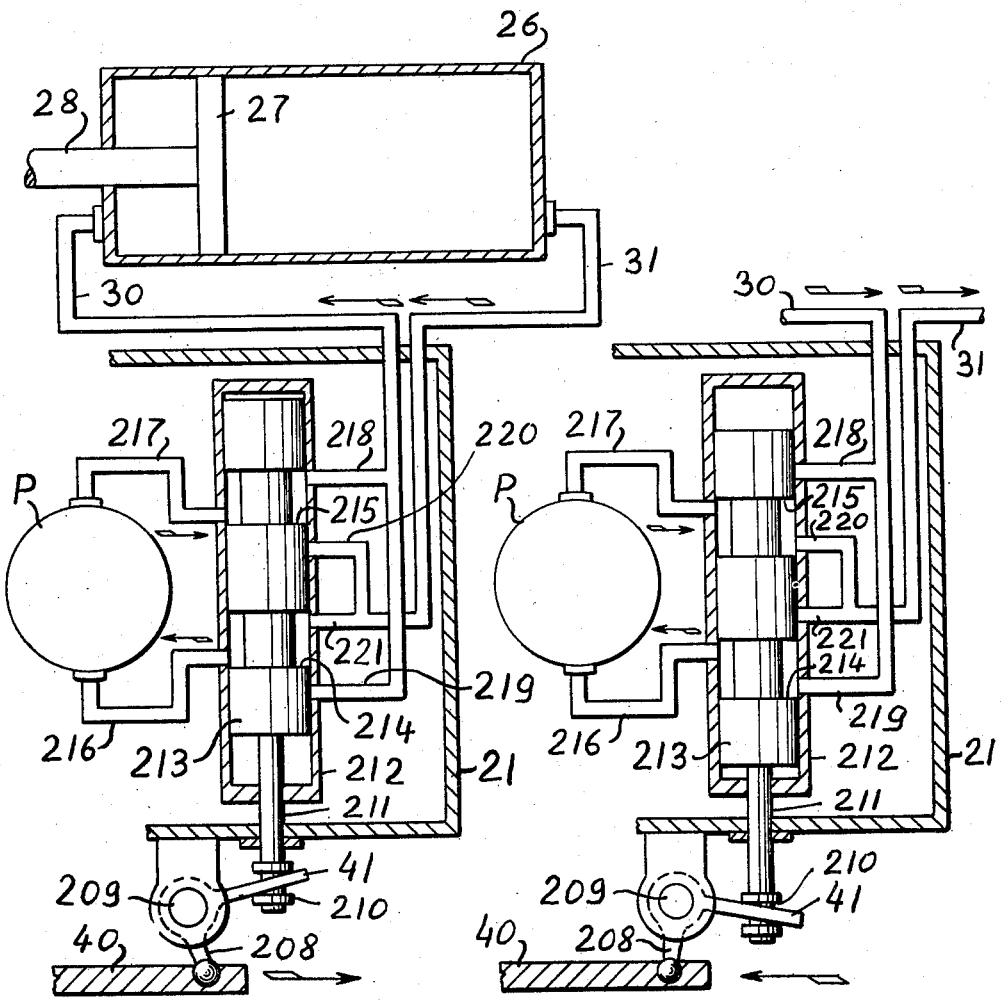

3,187,467
MACHINE FOR BEVELLING THE EDGES OF GLASS PLATES OR THE LIKE
Antonio Cortesi, 10 Via Lumagni, Lugo, Ravenna, Italy
Filed Apr. 9, 1963, Ser. No. 271,790
Claims priority, application Italy, Apr. 11, 1962, 7,921/62
6 Claims. (Cl. 51—34)

This invention relates to edge grinding of glass plates or the like and particularly to a machine for bevelling the edges of glass plates.

The main object of the invention is to provide a machine permitting of rapidly bevelling the edges of glass plates of any contour at any desired angle and for any desired width by grinding same all around, in a single operation.

Another object of the invention is to provide a machine permitting of effecting the bevel grinding of glass plate edges by utilizing the whole grinding surface of the grinding wheel or wheels.

Other objects and advantages of the invention will be apparent from the following specification.

The machine according to the invention is of the kind in which the glass plate is held firmly by suction cups or the like which are adjustably mounted, at least in part, on a fixed supporting upright member or column around which may revolve an arm, co-axially of said upright member or column, said arm carrying the grinding unit proper in such a manner as to permit of said grinding unit being shifted towards or away from the glass plate, held in fixed position, to follow the contour of its edges to be bevelled.

According to one embodiment of the invention, the grinding unit is rotatably mounted upon a slide or carriage shiftable along said revolvable arm and is provided with means for adjusting the height of said carriage and for inclining the axis of the grinding wheels, an adjustable supporting and abutment member being provided for holding the plate edge in a fixed position with respect to the grinding wheels.

Other characteristic features and advantages of the invention will be apparent from the following specification, reference being had to the accompanying drawings, in which:

FIGURE 3 is a view like that shown in FIGURE 2, but with some parts in section for showing the means for shifting axially and adjusting angularly the grinding wheel;

FIGURE 4 shows a vertical section of the abutment and supporting means of the border of the plate to be bevelled;

FIGURE 5 is an enlarged front view of the grinding unit with parts in vertical section to better illustrate the means for reciprocating axially the grinding head;

FIGURE 6 is a longitudinal vertical section on line VI—VI of FIGURE 5, showing the means for adjusting the height of the rear part of the grinding head;

FIGURE 7 shows in enlarged longitudinal section the device for the fine adjustment of the inclination of the grinding wheel axis;

FIGURE 8 is a cross section of the slide valve diagrammatically connected to the pressure fluid system and shown in a first position, and FIGURE 9 is a showing corresponding to FIGURE 8 illustrating the same valve in a second position.

Figure 1:
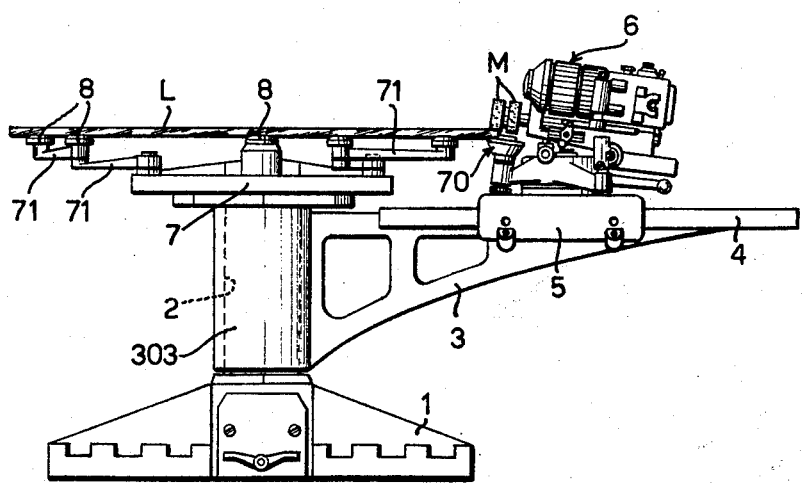
FIGURE 1 is a side elevation of a machine for bevelling the edges of glass plates according to the invention.

With reference to FIGURE 1 of the drawings, in one preferred embodiment of the invention, the glass plate bevelling machine comprises a base 1 carrying an upright column 2. On this column 2 a sleeve 303 carrying a bracket arm 3 is rotatably mounted. Upon the top end of the column, which projects above the said sleeve 303 a workpiece-holding member is mounted, which comprises a plurality of substantially co-planar suction cups 8, a part of which are mounted at the end of hinged arms 71, so as to permit of holding glass plates of different sizes and shapes, while leaving their edges free.

The bracket arm 3 is provided with means for supporting a grinding unit 6 in such a manner as to allow the grinding wheels M carried thereby to be shifted towards or away from the edges of the glass plate L, held in fixed position by the suction cups 8, while the bracket arm 3 is revolved around the column 2, so as to allow the grinding of all the plate edges, without shifting the plate.

According to the embodiment of the invention, as shown in FIGURES 1, 2, 3 and 5, the arm 3 is provided with guide rails 4 on which a carriage or slide 5 carrying the grinding unit 6 is shiftable.

Referring particularly to FIGURE 5, it may be seen that the guide rail 4 is made as a C-shaped member provided with oppositely outwardly projecting trapezoidally-shaped guide members 401 along which the carriage 5 may be shifted by being supported on rollers 54 engaging one face of the trapezoidal members 401 and prevented from being tipped when subjected to upward thrusts, by counter-rollers 55 engaging the other face of said trapezoidal guide members 401. The counter-rollers 55 are rotatably mounted in supporting members 56 fastened, as by screws 58, to projecting hubs 59 depending from the carriage 5.

The carriage 5 comprises also an upwardly projecting hub-like part 51 onto which a turret 9 is rotatably mounted on ball bearings 52 or the like and is prevented from being lifted away from the carriage hub 51 by a bolt-like pivot 10 (FIGS. 1 and 5).

Figure 2:
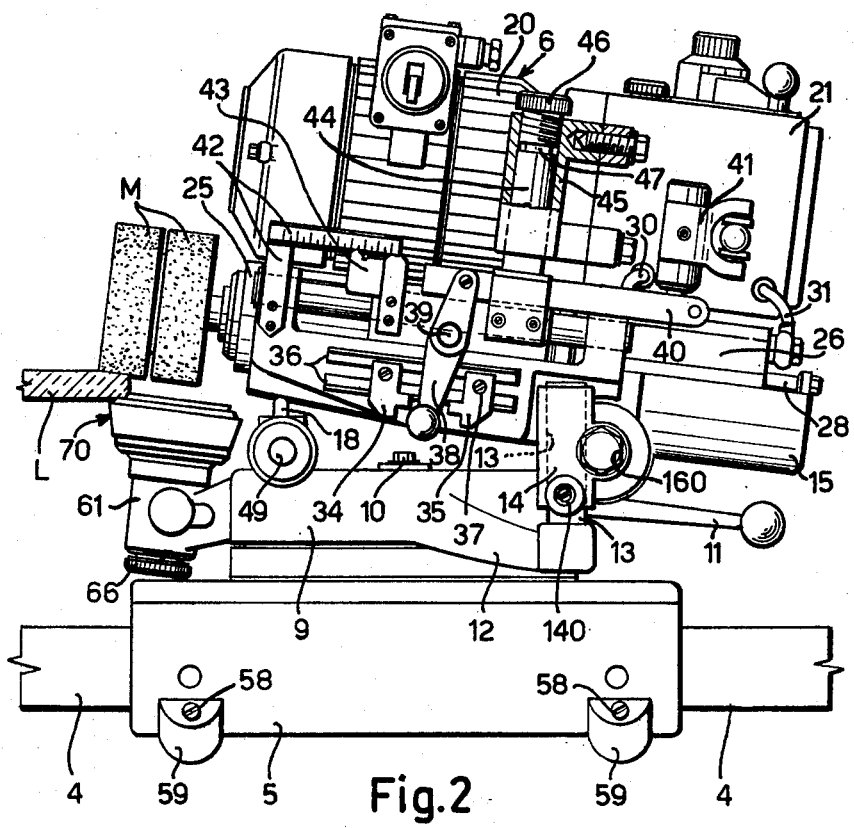
FIGURE 2 is an enlarged side elevation of the grinding head and adjoining abutment member for the glass plate to be bevelled.

The turret 9 is provided with a pair of oppositely lying projecting lugs 12 in which upwardly projecting pivot pins 13 are fitted. Upon these pins 13 corresponding bushings 14 are mounted, projecting laterally from the base member or cradle 15 of the working head proper. An idle shaft 16 provided at either end with a pinion 17 is mounted transversally of cradle 15 between the bushings 14. The pinions 17 mesh with racks 130 formed on the side of each pin 13. The shaft 16 is also provided at one end with a head 160 adapted to be engaged by a spanner or the like whenever is desired to rotate the shaft and its pinions 17 which, by rolling upon the racks 130 cause the bushings 14 to slide upon the pins 13 thus promoting the lifting or lowering of the shaft 16 and the consequent lifting or lowering of the rear end of said cradle and the grinding head 6 carried thereby. The cradle may be locked at the adjusted height by means of a clamping screw 140 (FIG. 2).

The front end of the cradle 15 bears upon an adjustable supporting member 18 projecting upwardly out of the turret 9 and which may be lifted or lowered by shiftable means, and for example as shown in FIGURE 7, by a cam-shaped supporting member 18 which projects upwardly out of a slot 470 of a supporting block 47 to which it is pivotally mounted at 180. The tail end of said cam-shaped member 18 may be pushed by means of push rod 50 projecting out of a threaded spindle 48, thus rotating said cam in clockwise direction, while by unscrewing the spindle 48 the cam is allowed to rotate in anticlockwise direction, under the weight of front end of the cradle 15. In this manner, by suitably shaping the cam, the cradle and the grinding head supported thereby may be inclined more or less, thus varying the angle of bevelling of the glass plate.

The grinding unit, which comprises an electric motor 20 which operates a hydraulic pump 21 and the grinding wheel M (this latter through pulleys 22, 23 and belt 24) is provided with a tubular housing 25 for the grinding wheel spindle, said housing being slidably mounted within the cradle 15. To the rear end of said housing 25 a hydraulic cylinder 26 is fastened, the ends of which are connected by flexible hoses 30 and 31 to the suction and delivery ports of the pump 21. In said cylinder 26 a piston 27 is slidably mounted, whose rod 28 is fastened to the cradle. A slide valve of conventional construction effects the connection of either of the flexible hoses 30 or 31 with the pressure side of the pump at the end of a predetermined stroke, and thus reverses the sliding movement of the grinding head 6 within its cradle 15. The housing 25 is additionally guided in its sliding movement by means of bushings 32 fastened to the housing body and which are slidably mounted on parallel guides 33 fastened to the cradle. The said slide valve (not shown) may be controlled by a sliding member 40, FIGURE 2, to which a double-armed lever 38 is hinged. This lever 38 is fulcrumed at 39 to a part of the housing 25 and its free arm swings between two adjustable abutment members 34 and 35 carried by the cradle 15, and which determine the conditions of reciprocation of the hydraulic cylinder 26 and of the grinding wheel M connected thereto.

Referring particularly to FIGS. 8 and 9, the slide valve is housed within casing 21, and comprises a cylinder 212, and a piston 213 housed therein and reciprocable between a first and a second end position. Piston 213 is provided with two axially spaced circumferential grooves 214 and 215 of a width corresponding to the piston stroke. In the region of groove 214 a pipe 216 opens into cylinder 212. Pipe 216 is connected to the intake of a pump P, the delivery side of which is connected to pipe 217 opening in the cylinder 212 in the region of groove 215. Groove 215 may be put alternatively into communication, by the movement of piston 213, with a duct 218 connected to duct 30 or with a duct 220 connected to duct 31. The groove 214 may be put into communication with a duct 221, connected to duct 31 or a duct 219 connected to duct 30. Ducts 30 and 31 are each connected to one end of the double-acting cylinder 26, in which piston 27 is slidably mounted, the rod 28 of which is fastened to the cradle 15 (see FIG. 3). The length of the stroke of the piston 213 is controlled through the sliding member 40 hinged at one end to the double armed lever 38 (FIG. 2) fulcrumed at 39 to a part of the housing 25, and having its free end swinging between two adjustable abutment members 34 and 35, carried by the cradle 15, which is reciprocated by piston 27 connected thereto by rod 28.

The second end of the sliding member 40 is connected through a ball joint connection to one arm 208 of a bellcrank lever fulcrumed at 210. The second arm 41 of said lever is fork-shaped and is in engagement with a circumferential groove 210 formed on the outwardly projecting end of the rod 211 of the piston 213.

The operation of the described valve is apparent:

With the piston 213 in the position as shown in FIG. 8, pump P is pumping fluid through duct 217, groove 215, duct 218, duct 30 into one end of the cylinder 26. Piston 27 is thus shifted to the right in FIG. 8. The fluid present in the right hand end of cylinder 26 is forced by the moving piston 27 through duct 31, duct 221, groove 214, duct 216 to the suction side of the pump P.

The cradle 15 (FIG. 2) is entrained in movement by piston 27, until abutment 34 abuts against free end of lever 38, thus swinging said lever in counterclockwise direction. The movement of lever 38 is transmitted to sliding member 40, which is pulled towards the left (as shown by the arrow in FIG. 9). The bellcrank lever 208-41 is thus operated by member 40, pushing piston 213 towards its second position, as shown in FIG. 9. In this position the circuit from the pump P to the cylinder 26 is reversed, that is the fluid pumped by pump P through duct 217 and groove 215 is now flowing through duct 220 and duct 31 in the second end of cylinder 26, thus pushing piston 27 in the reverse direction, while fluid from duct 30 is now flowing back through ducts 219, groove 214 and duct 216.

The said circuit is again reversed whenever lever 38 abuts against abutment 35.

The position of the edge of the glass plate L to be bevelled is determined by an adjustable abutment member 70 carried by the turret 9 and which may be constructed as particularly shown in FIGURES 2, 3 and 4.

With reference to these figures, the turret 9 is provided with a short supporting arm 60 pojecting laterally in a position intermediate the bushing 12, FIGURE 5, and ending with a bushing 61 the axis of which is slightly inclined inwardly with respect to the vertical axis of the turret. Within the bushing 61 a short shaft 62 provided with a longitudinal key slot 63 is slidably mounted. In this slot 63 is engaged the projecting end of a screw 64 screwed in a corresponding threaded bore of the bushing 61, so that the shaft 62 is allowed to slide but not to rotate. The shaft 62 is provided with an axial threaded bore in which the screw-threaded end of a spindle 65 provided with a control knob or handwheel 66 is screwed. The spindle 65 is rotatably mounted in the bore of an externally screw-threaded bushing 161 screwed onto the end of bushing 61 and is prevented from sliding through said bushing bore by a split ring 67 engaged in a peripheral grove of said shaft 65, as clearly shown in FIGURE 4.

The shaft 62 has a reduced extension 162 which, in its turn, is provided with a reduced end 262. Onto the reduced extension 162 a cup-shaped member 68 is mounted and retained by shiftable means, as a split ring 77 engaged in a corresponding peripheral groove of said extension 162.

In said cup-shaped member 68 a substantially frustoconical glass plate edge-supporting member 76 is rotatably mounted on bearing 69. Said edge-supporting member is hollow and in it and upon the reduced shaft end 262 a frusto-conical plate edge abutment member 73 is mounted, which is provided with an abutment washer 74 made of soft plastic material or the like, said abutment members 73 and 74 being retained by means of a retaining member 75. As clearly shown in said FIGURE 4, the glass plate bears by its peripheral part onto a rubber ring 78 encased in a corresponding groove of member 76 and abuts with its edge against the washer 74.

By operating on the handwheel 66 it is possible to regulate the height of the member 76 and annexed parts 73–74 with respect to the height of the border of the glass plate L.

From the foregoing, the operation of the thus described bevelling machine is apparent: The glass plate L is first laid upon the suction cups 8 and is retained thereby in a known manner by vacuum. Then the carriage is shifted by means of the handle 11 so that the glass plate border bears onto the member 70, whereby the relative heights and the inclination of the grinding unit 6 are adjusted by rotating the shaft 16 by means of the head 160 and by adjusting the height of the supporting member 18 by operating on the threaded spindle 48, FIGURE 7.

By operating the motor 20 while maintaining the grinding wheel M upon the plate border and by revolving the grinding unit, by means of the handle 11, all around the fixed glass plate L so as to maintain the edge thereof against the abutment member 70, the border of the glass plate may be bevelled all around at the desired inclination. During the grinding operation, the grinding wheel or wheels M are reciprocated axially by the hydraulic cylinder 26, so that whole useful surface of the grinding wheel or wheels M may be evenly consumed.

I claim:

1. A machine for bevelling the edges of plates comprising a column, means for fixedly supporting a work plate to be bevelled on said column in a work plane, a radial arm rotatably mounted on said column, guide means on said radial arm extending lengthwise thereof, a carriage movably mounted along said guide means, means for retaining said carriage during movement in close contact with said guide means, a turret rotatably mounted on said carriage, a grinding unit including a motor and a grinding wheel mounted on said turret, means for adjusting the height and inclination of said grinding unit with respect to said work plane, a work plate abutment device projecting from said turret for engagement with the lower side and edge of a plate to be bevelled, and means for adjusting the height of said work plate abutment device with respect to said work plane.

2. A machine according to claim 1 in which said means for adjusting the height and inclination of the grinding unit comprises a cradle and means for pivotally mounting said cradle on said turret.

3. A machine according to claim 1 in which said grinding unit includes a grinding head proper composed of a motor, a grinding wheel and the driving connections therefor, and a cradle pivotally mounted on said turret and means for reciprocating said grinding head along said cradle, said means for reciprocating the grinding head comprising a hydraulic piston fastened to said cradle, a hydraulic cylinder fastened to said grinding head, a pump, switch means for alternatively connecting the pressure side of said pump with either of the cylinder ends, and adjustable abutment means co-acting with said switch means for determining the positions in which the reciprocations of said cylinder take place.

4. A machine according to claim 1 in which said means for adjusting the height and inclination of the cradle comprises a hinge at one end of the cradle permitting it to swing in a vertical plane, and adjustable means projecting from said turret to support the other end of the cradle, said hinge being connected to means for adjusting the height of the hinge with respect to said turret.

5. A machine according to claim 1 in which said work plate abutment device comprises a fixed arm terminating in a bushing and projecting from said turret, a shaft having two reduced end sections slidable in but restrained from rotation with respect to said bushing, a cup-shaped plate supporting member and a co-axial cup-shaped plate edge abutment member both mounted for rotation about their common axis, means for rotatably mounting said plate supporting and edge abutment members upon the reduced end sections of said shaft, said means for adjusting the height of said abutment device comprising means for moving said shaft in said bushing.

6. A machine according to claim 1 wherein said means for fixedly supporting a work plate comprises means for holding a work plate in a substantially horizontal work plane, and said means for adjusting the height and inclination of the grinding unit pivotally moves the unit in a substantially vertical plane.

References Cited by the Examiner
UNITED STATES PATENTS
2,187,748   1/40   Macellaro et al.

LESTER M. SWINGLE, *Primary Examiner*.